Feb. 1, 1927.

R. KANIA 1,616,050

DOMESTIC BOILER

Filed Aug. 11, 1925

Inventor
Rudolph Kania

By

Attorney

Patented Feb. 1, 1927.

1,616,050

UNITED STATES PATENT OFFICE.

RUDOLPH KANIA, OF VINDEX, MARYLAND.

DOMESTIC BOILER.

Application filed August 11, 1925. Serial No. 49,567.

This invention relates to improvements in domestic boilers.

The principal object of this invention is to provide a double boiler equipped with a dome-shaped perforated cover allowing a regulation of the exhaust of the steam so that the perforations in the cover may be closed, if necessary, when rapid cooking is desired, thereby utilizing the steam to intensify the heat within the cooking vessel.

Another object of this invention is the provision of means for conveniently supplying water to the outer vessel and for replenishing this supply.

A further object of this invention is the provision of suitable means to keep the bottoms of the outer and inner vessels suitably spaced from each other to avoid burning.

A further object of this invention is the provision of convenient handles for the several boilers and of means for quickly ascertaining the amount of water contained in the outer vessel, and for returning material to the inner vessel.

A further object of this invention is to provide a cooker of the class described in which a cover member serves both for the inner and the outer vessel in a most convenient manner and in a manner which permits the use of either with the cover member without any overhanging parts and in a convenient manner.

In the accompanying drawing, forming a material part of this disclosure:

Figure 1:
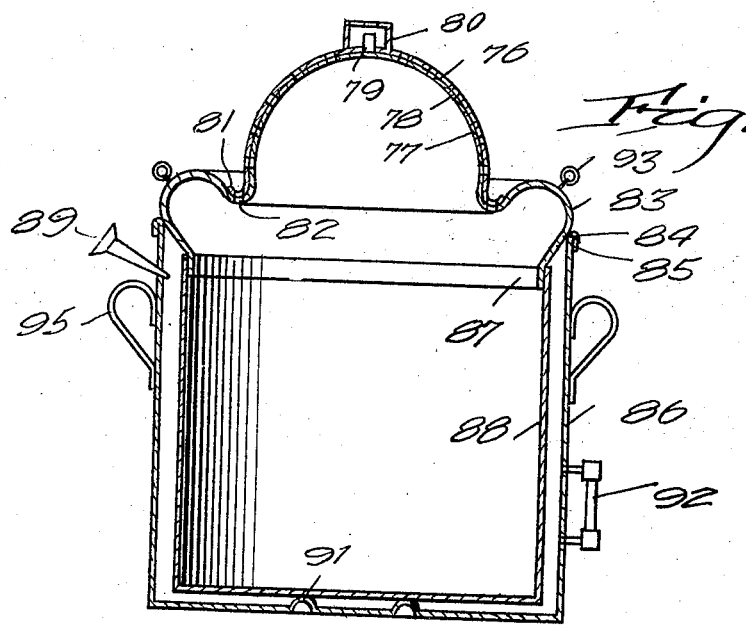
Figure 1 is a vertical sectional view showing the boiler, constructed according to the present invention.
Figure 2:
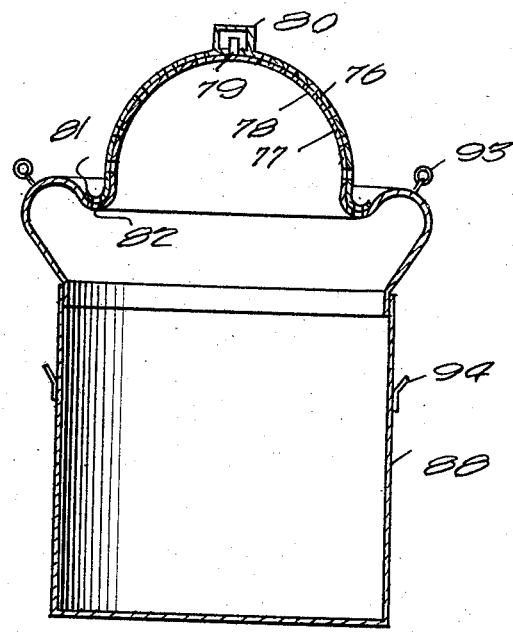
Figure 2 is a vertical sectional view through the inner vessel.

As shown in Figures 1 and 2 of the drawing, my improved boiler consists of an outer dome-shaped cover 76 and an inner dome-shaped cover 77, the inner dome cover provided with perforations 78 analogous to the perforations shown in the other forms, the cover member 77 being further provided with a pivotal bearing 79 in the form of a stub shaft and the cover 76 being bent in journal form as at 80 to form a bearing upon the shaft 79. The cover 76 is formed of pressed sheet metal and provided with suitable perforations adapted to register with the perforations 78, and the journal 80 is pressed from this sheet metal and serves also as a handle for turning the dome 76. The dome 76 is flanged outwardly and upwardly as at 81, there being provided in the cover 77 a trough or channel 82 into which the flanged portion 81 closely fits. The cover member 77 is bent upwardly into torus shape at 83 and thence downwardly at an incline at 84 so that one edge of the incline slidingly and at the same time clampingly fits within the upper portion 85 of the outer vessel 86, while the bottom edge of the cover member 76 is annular shaped as at 87 and fits within the top of the inner vessel 88. In this manner it will be seen that the cover member 76 serves as a cover for either vessel 86 or 88, whether the two vessels are mounted together or whether they are in a separated position as shown in Figure 2, in which Figure 2 is shown the inner vessel with the cover 76 mounted thereon and without any overhanging or sharp obstructions projecting from the sides of the vessel. Likewise, if the cover member 76 were mounted to the outer vessel 86 with the inner vessel removed, it is obvious that there would be no outwardly projecting portions.

I provide a funnel or filler arrangement 89 passing through the side wall of the vessel 86 as at 90 and further provide a suitable raised portion 91 to keep the vessels suitably spaced at their bottoms and also provide a water gauge as shown at 92. I further provide a plurality of rings 93 upon the cover 76 for lifting the same, and also handles 94 upon the inner vessel and handles 95 on the outer vessel.

The edge portion of the hood enters the trough and is provided with openings adapted to register with the openings in the bottom of the trough. By reason of this arrangement the trough may be used for retaining the liquid when the openings are out of register and this liquid may serve as a seal between the hood and the dome-shaped portion of the cover. Furthermore, the hood fits snugly over the dome-shaped portion of the cover and by reason of this arrangement the seal is made more effective.

Claims:

1. A domestic boiler comprising inner and outer receptacles, a cover for closing the receptacles, said cover having a depressed circumferential flange portion forming a trough, said trough having openings to permit material to return to the inner receptacle, said cover having a dome-shaped intermediate portion and a hood pivoted upon the dome-shaped portion of the cover and having an edge portion which enters the trough and which is provided with openings adapted to register with the opening in the bottom of the trough.

2. A domestic boiler comprising inner and outer receptacles, a cover for closing the receptacles, said cover having a depressed circumferential flange portion providing a trough, said trough having openings to permit material to return to the inner receptacle, said cover having a dome-shaped intermediate portion, a hood pivoted upon the dome-shaped portion and fitting snugly thereon and having an end portion which enters the trough, the edge of the hood being provided with openings adapted to register with the openings in the bottom of the trough.

In testimony whereof I affix my signature.

RUDOLPH KANIA.